US008863222B2

United States Patent
Li et al.

(10) Patent No.: US 8,863,222 B2
(45) Date of Patent: Oct. 14, 2014

(54) MULTIPLEXING, SYNCHRONIZING, AND ASSEMBLING MULTIPLE AUDIO/VIDEO (A/V) STREAMS IN A MEDIA GATEWAY

(75) Inventors: Gordon Yong Li, San Diego, CA (US); Xuemin Chen, Santa Fe, CA (US); Arlen J Kirchoff, Jr., Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/170,653

(22) Filed: Jun. 28, 2011

(65) Prior Publication Data

US 2012/0304243 A1 Nov. 29, 2012

Related U.S. Application Data (60) Provisional application No. 61/489,152, filed on May 23, 2011.

(51) Int. Cl.
| | |
|---|---|
| *H04N 7/173* | (2011.01) |
| *H04N 7/16* | (2011.01) |
| *H04N 21/4363* | (2011.01) |
| *H04N 7/15* | (2006.01) |
| *H04N 21/845* | (2011.01) |
| *H04N 21/643* | (2011.01) |
| *H04N 21/436* | (2011.01) |
| *H04L 12/18* | (2006.01) |

(52) U.S. Cl.
CPC ........... *H04N 7/152* (2013.01); *H04N 21/4363* (2013.01); *H04N 21/8456* (2013.01); *H04N 21/64322* (2013.01); *H04N 21/43615* (2013.01); *H04L 12/1827* (2013.01)

USPC ................. 725/146; 725/87; 725/93; 725/98; 725/110; 725/111

(58) Field of Classification Search
USPC .................... 725/87, 93, 98, 110, 111, 146
See application file for complete search history.

(56) References Cited

U.S. PATENT DOCUMENTS

| 7,587,736 | B2 * | 9/2009 | Summers et al. ................ 725/95 |
| 2006/0184985 | A1 * | 8/2006 | LeComte et al. ................ 725/90 |
| 2006/0257103 | A1 * | 11/2006 | Lim et al. ......................... 386/95 |
| 2012/0140685 | A1 * | 6/2012 | Lederer et al. ................ 370/286 |
| 2012/0144445 | A1 * | 6/2012 | Bonta et al. .................... 725/116 |

\* cited by examiner

*Primary Examiner* — Kieu Oanh T Bui (74) *Attorney, Agent, or Firm* — Foley & Lardner LLP; Christopher J. McKenna; Daniel E. Rose (57) ABSTRACT

A media gateway that services a plurality of client devices may be used to combine a plurality of encoded multimedia transport streams, which may comprise a buffered copy of received encoded broadcast multimedia transport stream and an encoded local multimedia transport stream that pertains to the broadcast transport stream. The media gateway may decode the encoded broadcast multimedia transport stream to extract broadcast multimedia content carried therein based on determination of capabilities of one or more client devices used in playback of the content. The encoded local multimedia transport stream may be generated based on local multimedia content generated and/or captured via one or more client devices. The buffering duration of the received encoded broadcast multimedia transport stream may be adaptively determined, to ensure that the encoded local multimedia transport stream and the encoded broadcast multimedia transport stream are synchronized when they are combined.

21 Claims, 6 Drawing Sheets

MULTIPLEXING, SYNCHRONIZING, AND ASSEMBLING MULTIPLE AUDIO/VIDEO (A/V) STREAMS IN A MEDIA GATEWAY

CLAIM OF PRIORITY

This patent application makes reference to, claims priority to and claims benefit from U.S. Provisional Application Ser. No. 61/489,152, entitled "Two-Way Communications over IP Networks," which was filed on May 23, 2011.

The above stated application is hereby incorporated herein by reference in its entirety.

CROSS-REFERENCE TO RELATED APPLICATIONS/INCORPORATION BY REFERENCE

This application also makes reference to:

U.S. application Ser. No. 13/170,503, entitled "Integrated Media Gateway Processing and Control to Reduce Latency for 2-Way Video Conference Applications," filed on even date herewith;

U.S. application Ser. No. 13/171,097, entitled "Two-Way Audio and Video Communication Utilizing Segment-Based Adaptive Streaming Techniques," filed on even date herewith; and U.S. application Ser. No. 13/171,123, entitled "Utilizing Multi-Dimensional Resource Allocation Metrics for Concurrent Decoding of Time-Sensitive and Non-Time-Sensitive Content," filed on even date herewith.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for multiplexing, synchronizing, and assembling multiple audio/video (A/V) streams in a media gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV, and/or Internet Protocol television (IPTV) based broadcasts. To protect against unauthorized reception and/or use of multimedia content, service providers may require use of dedicated set-top boxes (STBs) that may be used to decrypt broadcast signals or provide conditional access to information communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for multiplexing, synchronizing, and assembling multiple audio/video (A/V) streams in a media gateway, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multiplexing, synchronizing, and assembling multiple audio/video (A/V) streams in a media gateway. In various embodiments of the invention, a media gateway which may be utilized to service a plurality of client devices, may be utilized to combine a plurality of encoded multimedia transport streams, which may comprise an encoded broadcast multimedia transport stream and an encoded local multimedia transport stream that pertains to the broadcast transport stream. The media gateway may receive via one or more delivery networks, the encoded broadcast multimedia transport stream, which may comprise broadcast multimedia content for consumption via at least one of the plurality of client devices. The received encoded broadcast multimedia transport stream may be buffered to enable combining operations. The media gateway may decode the encoded broadcast multimedia transport stream to extract the broadcast multimedia content carried therein, based on determination of capabilities of one or more client devices used in playback of the content. The encoded local multimedia transport stream may be generated based on local multimedia content generated and/or captured via one or more client devices. In this regard, the generated local multimedia content may comprise video and/or audio information relating to broadcast multimedia content that is consumed and/or played back via one or more of the client devices.

Encoding the local multimedia transport stream may be performed by utilizing an encoding profile selected from a set of different encoding profiles, each of which comprising various encoding information such as audio and video resolutions, CODEC types, and/or lengths of audio and video segments. The media gateway may be operable to adaptively determine a duration for buffering the encoded multimedia transport streams. In this regard, the buffering duration of the received encoded broadcast multimedia transport stream may be determined adaptively, to ensure that the encoded local multimedia transport stream and the encoded broadcast multimedia transport stream are synchronized when they are combined. The synchronization may be performed based on correlating local multimedia content included in the encoded local multimedia transport stream with the multimedia content included in the encoded broadcast multimedia transport stream. The buffering duration may be determined based on determination and/or estimation of latencies associated with handling of the encoded broadcast multimedia transport stream and the encoded local multimedia transport stream. The latencies may comprise delays associated with decoding the encoded broadcast multimedia transport stream, playback of the broadcast multimedia content, generation of the local multimedia content, and/or encoding of the encoded local multimedia transport stream.

Figure 1:
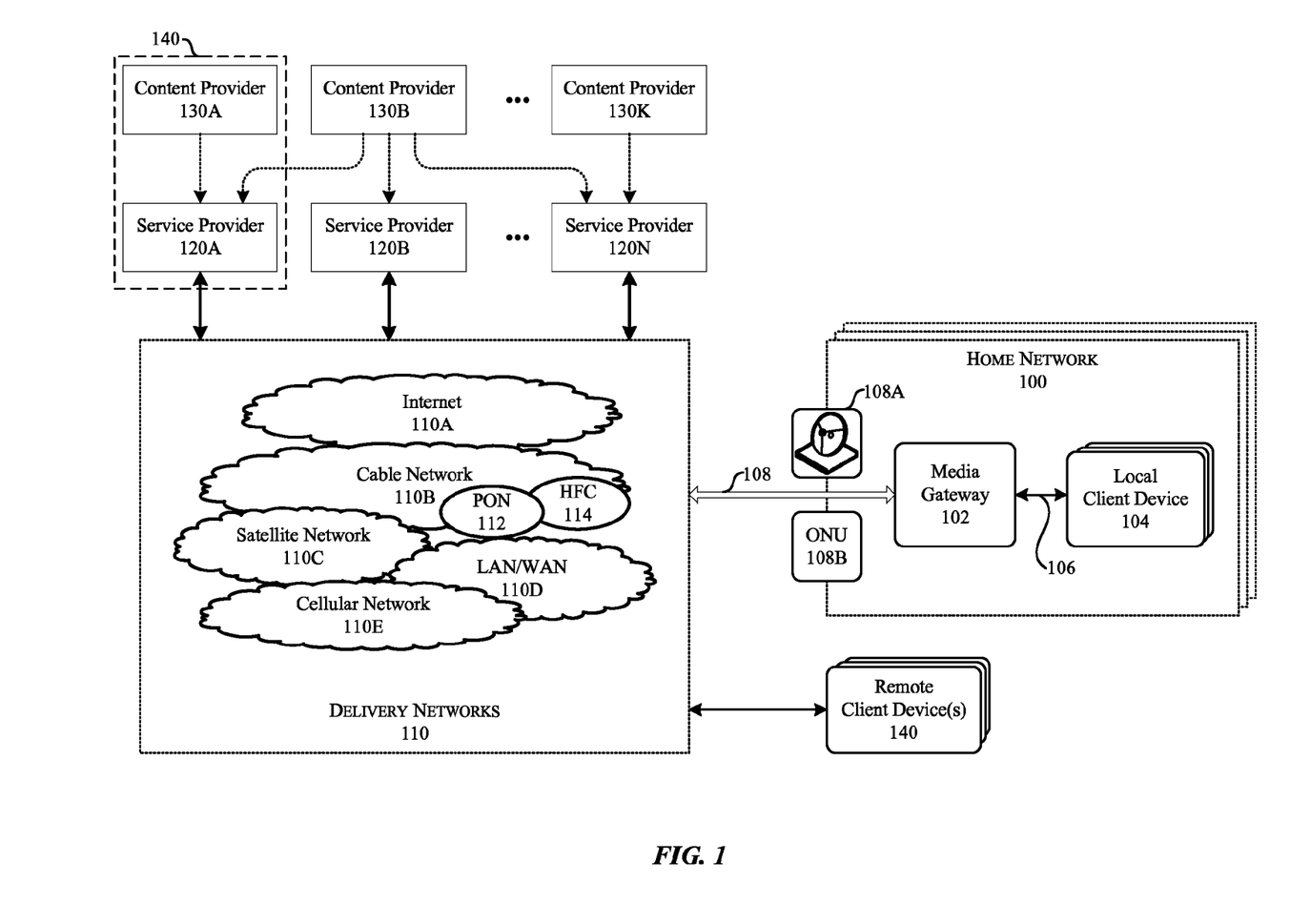
FIG. 1 is a block diagram illustrating an exemplary communication system that comprises a home network serviced by a home gateway, which may be utilized in accordance with an embodiment of the invention.

FIG. 1 is a block diagram illustrating an exemplary communication system that comprises a home network serviced by a home gateway, which may be utilized in accordance with an embodiment of the invention. Referring to FIG. 1, there is shown one or more home networks 100, a plurality of delivery networks 110, a plurality of service providers 120A-120N, and a plurality of content providers 130A-130K. Each home network 100 may be serviced by a media gateway 102. Furthermore, the home network 100 may comprise one or more local client device 104.

The service providers 120A-20N may comprise various entities which may provide, using different access technologies or protocols, various services to media gateways 102 and/or to devices serviced thereby. The access technologies and services may include, but are not limited to, network access, multimedia, television, Internet, phone, Ethernet, multimedia over coax alliance (MoCA), and/or passive optical network (PON) access for example. In this regard, at least some of the service providers 120A-120N may comprise network access service providers, providing physical connections to the media gateway 102. Such physical connections may then be utilized to access content provided by the content providers 130A-130K, access services provided by other ones of the service providers 120A-120N, and/or access to intranets or the Internet at-large. In this regard, "network access service provider" as utilized herein, is distinguished from the more generic term "service provider" which may encompass services other than providing physical access to a network. Cable television providers, plain old telephone service (POTS) providers, digital subscriber line (DSL) providers, cellular providers, WiMAX providers, and satellite providers are examples of network access service providers. In an exemplary aspect of the invention, the media gateway 102 may be operable to connect to multiple service providers 120A-120N to facilitate receiving content originating from one or more of the content providers 130A-130K.

The content providers 130A-130K may comprise various entities and/or networks which may generate, capture, and/or package content that may be distributed to end-users, via the service providers 120A-120N and/or the delivery networks 110. In this regard, content may comprise audio, video, multimedia, e-book, gaming, and/or other content. The delivered content may comprise commercial content, such as content generated by film or television production and/or distribution companies (e.g. Paramount Pictures or Warner Bros.), and/or personal content, such as user-generated content. The content may be, for example, downloadable and/or streaming, rented and/or purchased. Content originating from the content providers 130A-130K may be distributed to the end-users (e.g. consumers) by the service providers 120A-120N.

The content providers 130A-130K and service providers 120A-120N may be separate entities. In some instances, however, a single provider may provide both content and services, as demonstrated by dashed line 140 for example. That is, an entity that functions as a network access service provider may also generate and/or provide content and/or services other than network access and, thus, that entity may also be accurately referred to as a "content provider" and/or a "service provider." The content and/or services that are provided by the content provider and/or the service provider may be provided to the media gateways 102 via one or more physical connections provided by a network access service provider.

The delivery networks 110 may comprise one or more networks that may enable wireless and/or wired communication among a plurality of local and/or remote entities, based on one or more networking and/or communication infrastructures. In this regard, the delivery networks 110 may enable distribution of multimedia content from the content providers 130A-130K, directly and/or via the service providers 120A-120N, to end-users. The network connectivity available via the delivery networks 110 may be based on one or more communication standards and/or protocols. The delivery networks 110 may comprise, for example, Internet 110A, cable network 110B, and/or satellite network 110C, wireless local network area/wide network area (LAN/WAN) 110D, and/or cellular network 110E.

The Internet 110A may comprise a system of interconnected networks to enable exchange of data between a plurality of nodes, based on one or more networking standards, including, for example, the Internet protocol (IP). For example, the Internet 110A may enable connectivity among a plurality of private and public, academic, business, and/or government nodes and/or networks. The physical connectivity may be provided in the Internet 110A via, for example, the Public Switched Telephone Network (PSTN), copper wires, fiber-optic cables, wireless interfaces, and/or other protocols and/or standards-based interfaces. The transport functionality may be performed in the Internet 110A based on, for example, one or more protocols, such as the TCP/IP protocol for example.

The cable network 110B may comprise suitable distribution nodes, systems, and/or subnetworks that may enable forwarding of communication between cable providers and a plurality of consumers. In this regard, the cable network 110B may comprise a network of fiber optics and/or coaxial cables for use in cable broadcasts. For example, in addition to traditional coaxial based networks, the cable network 110B may comprise one or more passive optical networks (PON) 112 and/or one or more hybrid fiber-coax (HFC) networks 114. Receiving optical signals, delivered via the PON 112 and/or the HFC 114, may require use of dedicated devices, such as optical network unit (ONU) 108B, at the home network 100. The ONU 108B may comprise suitable logic, circuitry, interfaces, and/or code that may be operable to terminate fiber connections, to facilitate receiving of incoming optical signals, and transform them into electrical signals that may be further processed within the home network 100, such as via the media gateway 102. This may enable media gateway 102 to extract multimedia content carried by the optical signals.

The satellite network 110C may comprise suitable distribution nodes, systems, and/or subnetworks that may enable communication of satellite broadcasts by satellite providers to a plurality of consumers. For example, the satellite network 110C may comprise a plurality of orbiting satellite nodes and/or one or more terrestrial centers in a satellite broadcast system. Receiving satellite signals may require use of dedicate devices, such as satellite receiver 108A. The satellite receiver 108A may comprise suitable logic, circuitry, interfaces, and/or code that may be operable to receive incoming satellite signals, and transform them into signals that may be further processed within the home network 100, such as via the media gateway 102, to enable extraction of multimedia content carried thereby.

The LAN/WAN network 110D may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks.

The cellular network 110E may comprise suitable logic, circuitry, interfaces and/or code that may be operable to enable communication via one or more cellular technologies. Exemplary cellular technologies may comprise Code Division Multiple Access (CDMA), wideband CDMA (W-CDMA), CDMA2000, High-Speed Downlink Packet Access (HSDPA), Global System for Mobile Communications (GSM), General Packet Radio Services (GPRS), Enhanced Data Rates for Global Evolution (EDGE), and/or other forms of Universal Mobile Telecommunication System (UMTS). The cellular network 110E may comprise, for example, a plurality of control and/or switching nodes, and a plurality of base stations that enable transmission and/or reception of cellular based communications between the cellular network 110E and cellular capable devices Each home network 100 may correspond to a location that may comprise a plurality of devices which may be serviced and/or managed by the media gateway 102. In this regard, the location may be a residence (e.g. home or apartment), a small business, a school, a library, and/or other like settings in which users may want to obtain access to service and/or content provider networks. The media gateway 102 may be utilized in the home network 102 to provide connectivity between the home network 100 and the service providers 120A-120N and/or the content providers 130A-130K, via the delivery networks 110.

The media gateway 102 may comprise suitable logic, circuitry, interfaces, and/or code that may be operable to implement various aspects of the invention. In this regard, the media gateway 102 may be operable to communicate with the content providers 130A-130K, the service providers 120A-120N, and the local client devices 104. In this manner, the media gateway 102 may enable bidirectional communication of content and/or other information between the content providers 130A-130K, the service providers 120A-120N and the client devices 104. To support content delivery operations, the media gateway 102 may function and/or be configured as a cable/satellite set-top box (STB) and/or an Internet Protocol Television (IPTV) gateway. Communications between the media gateway 102 and the content providers 130A-130K and/or service providers 120A-120N may be carried over optical, wired, and/or wireless links of the delivery networks 110. The media gateway 102 may be operable to handle multiple physical layer connections to multiple ones, or portions, of the delivery networks 110, where different ones or portions of the delivery networks 110 are owned, operated, leased, or otherwise associated with different ones of the network access service providers 120A-120N. In some instances, the media gateway 102 may be operable to concurrently communicate over multiple physical connections provided by the multiple network access service providers. For example, the media gateway 102 may be operable to configure and/or utilize one or more connections 108 to the delivery networks 110. The connections 108 may comprise wired and/or wireless connections between the media gateway 102 and the delivery networks 110, which may enable communication between the media gateway 102 and the service providers 120A-120N.

The media gateway 102 may service a plurality of client devices, which may comprise local client device 104 and one or more remote client device 140. The client devices may comprise personal and/or household devices that may be operable to interact with, and/or be communicatively coupled to the media gateway 102. In this regard, the local client devices 104 and/or the remote client devices 140 may comprise content consuming devices. Exemplary client devices may comprise, for example, televisions, computers (desktops or laptops), smartphones, tablets, digital video recorder (DVR), and/or personal video recorder (PVR). Communications between the media gateway 102 and the client devices may be carried over optical, wired, and/or wireless links. The media gateway 102 may interact with the local client devices 104 via links 106, each of which may be supported by the media gateway 102 and the corresponding client device. Exemplary links 106 may comprise High-Definition Multimedia Interface (HDMI) cables, 60 GHz WiGig wireless connections, wired Ethernet connections, WiFi connections, multimedia over coax alliance (MoCA) connections, and/or HomePNA connections. The media gateway 102 may also interact with, and/or service the remote client devices 140. In this regard, the media gateway 102 may interact with the remote client devices 140 indirectly, such as via the delivery networks 110. For example, communication between the gateway 102 and the remote client devices 140 may be performed as IP interactions via the Internet 110A.

The media gateway 102 may operate as an interface device that may allow one or more service and/or content providers to interact with various devices in the home network. In this regard, the media gateway 102 may enable delivering multimedia content to the home network 100 through one or more service providers 120A-120N. For example, the media gateway 102 may be operable to perform such operations as network access processing comprising PHY/MAC, and/or transport layer processing, as well as encryption and/or decryption, user and/or device authentication, and/or video and/or audio processing, to facilitate communication and/or consumption of multimedia content for example.

As illustrated in FIG. 1, a plurality of home networks 100 may be connected to the delivery networks 110, and these home networks 100 may operate in substantially the same manner. Accordingly, by having multiple home networks connected to the delivery networks 110, various applications, such as peer-to-peer communication and/or data aggregation operations may be possible provided by utilizing the media gateways 102 in the home networks 100. For example, client devices 104 in different home networks 100 may communicate peer-to-peer connections, which may be established by corresponding media gateways 102, using direct connection therebetween and/or indirect connections, such as via Internet 110A for example.

While the media gateway 102 is shown in FIG. 1 as a single and separate device, the invention need not be so limited. In one embodiment of the invention, the media gateway functionality may be implemented in a distributed manner over two or more devices. Furthermore, the media gateway may be implemented as a virtual platform, for example in instances where it may be implemented in distributed manner. In another embodiment of the invention, some or all of the functionality of the media gateway may be implemented within one of the televisions available in the home.

In operation, the media gateway 102 may be utilized as an interface device that may allow one or more service providers 120A-120N and/or content providers 130A-130K to interact with various devices in a home network, such as in the home network 100. In this regard, the media gateway 102 may support configuring and/or using the plurality of connections 108. The connections 108 may comprise optical, wired and/or wireless connections between the media gateway 102 and the delivery networks 110, to enable communication between the media gateway 102 and the service providers 120A-120N and/or content providers 130A-130K for example. The media gateway 102 may be operable to perform and/or provide various services that may pertain to enabling and/or facilitating reception of data, such as multimedia content, for example, from one or more content providers, wherein the content may be delivered through one or more services providers. In this regard, content may be delivered to the home network 100 via, and/or may be received by the media gateway 102 from the delivery networks 110. Content delivery may comprise use of traditional content delivery services, comprising traditional terrestrial (over-the-air), cable, and/or satellite delivery services, and/or IP based streaming or downloading. The media gateway 102 may distribute the content to one or more client devices in a home network, for consumption, and/or may perform, directly and/or indirectly using other devices in the home network 100, any processing and/or operations (e.g., decryption and/or account validation) that may be needed to ensure that the content may be consumed properly and/or securely by the target client device(s).

The media gateway 102 may also provide and/or support various other services in the home network 100 beyond reception and/or download of content. For example, the media gateway 102 may be operable to support peer-to-peer communications, in which users may exchange audio and/or video data. The media gateway 102 may be operable to support, for example, multimedia calls, such as during video conferencing (VC) applications. In this regard, at least some of the client devices 104 serviced by the media gateway 102 may be utilized as terminals during such multimedia calls. During such multimedia calls, one or more client devices 104 in the home network 100 may be utilized for capturing and/or generating audio/video (A/V) content corresponding to user input, and/or in playing back A/V content corresponding to user output. In this regard, the exchanged A/V content may be communicated, for example, via transport streams (TSs). The A/V content communicated from and/or to the client devices 104 may be routed and/or forwarded via the media gateway 102. The media gateway 102 may utilize its network access physical connections for communicating, via the delivery networks 110, the A/V content associated with multimedia calls between client devices 104 in the home network 100 and remote multimedia call peers. In some instances, the media gateway 102 may enable routing the A/V content associated with multimedia calls within the home network 100, such as between different client devices 104, in the home network 100, which are being utilized as multimedia call peers.

In various embodiments of the invention, the media gateway 102 may be operable to combine, during such peer-to-peer multimedia communication, multiple transport streams (TSs) comprising multimedia content, where the content of different TSs may be correlated and/or related. For example, during a video conference (VC) call, a user may be generating audio/video (A/V) content. The user may separately perceive, during the VC call, A/V content obtained via multimedia broadcast stream, which may be received via the media gateway 102, and which may be displayed and/or played back via one or more of the client devices 104. In this regard, at least some of the A/V content generated by the user during the VC call may pertain to the perceived broadcast A/V content. For example, the user may comment on and/or may reference something the user is seeing or hearing while perceiving the broadcast A/V content.

Accordingly, a copy of the received broadcast A/V stream may be combined with the A/V content transport stream pertaining to VC call. Furthermore, because some of the VC A/V content may pertain directly to the broadcast A/V content, the media gateway 102 may be operable to synchronize the broadcast A/V stream and the VC A/V content transport stream during combination of these streams. This may ensure that the pertinent information is correlated and/or are available at the same time when the streams are received and consumed at the other side.

Figure 2:
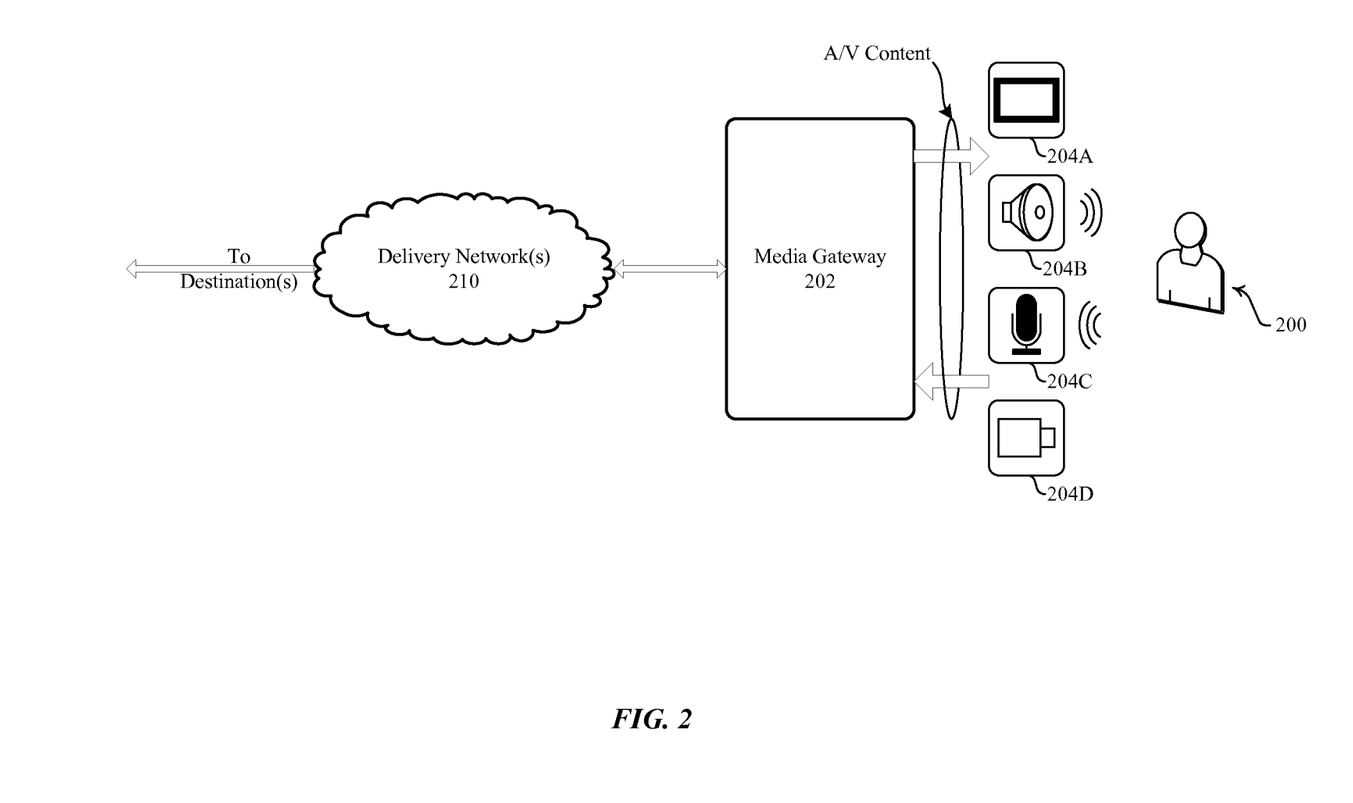
FIG. 2 is a block diagram illustrating an exemplary home gateway that may enable concurrent playback and generation of audio/video (A/V) content, in accordance with an embodiment of the invention.

FIG. 2 is a block diagram illustrating an exemplary home gateway that may enable concurrent playback and generation of audio/video (A/V) content, in accordance with an embodiment of the invention. Referring to FIG. 2, there is shown a media gateway 202, a plurality of A/V devices 204A-204D, and a delivery network 210.

The media gateway 202 may be similar to the media gateway 102, substantially as described with regard to FIG. 1. In this regard, the media gateway 202 may be operable to provide various services and/or applications to a plurality of client devices in a home network. For example, the media gateway 202 may support use of the plurality of A/V devices 204A-204D in conjunction with consumption and/or generation of A/V content. The A/V devices 204A-204D may correspond to client devices serviced by the media gateway 300, and/or dedicated components thereof utilized during audio/video (A/V) input/output operations. Exemplary A/V client devices may comprise a display 204A, a speaker 204B, a microphone 204C, and a camera 204D.

The display 204A may comprise suitable logic, circuitry, interfaces and/or code that may be operable to display images and/or streams based on video data, which may incorporated into received audio/video (A/V) streams. The display 204A may comprise, for example, a television or a monitor. Video display operations may comprise performing, via the display 204A or other entities such as the media gateway 300, video decoding and/or decompression.

The speaker 204B may comprise suitable logic, circuitry, interfaces and/or code that may be operable to output audio, by converting audio information into electrical signals and/or transducing these electrical signals into sound waves. Audio playback operations may comprise performing, via the speaker 204B or other entities such as the media gateway 300, audio decoding and/or decompression.

The microphone 204C may comprise suitable circuitry, logic, interface(s), and/or code that may detect and/or capture sound waves, and convert them to electrical signals, which may be analog and/or digital signals. In this regard, in instances where the electrical signals generated by the microphone 204C comprise analog signals, analog-to-digital conversion may be required before the captured signals are processed. These signals may then be converted, via the microphone 204C or other entities such as the media gateway 300, to audio data by use of audio encoding and/or compression.

The camera 204D may comprise suitable circuitry, logic, interface(s), and/or code that may detect and/or capture images, which may be still and/or moving (i.e. video), and convert them to electrical signals. These signals may then be converted, via the camera 204D or other entities such as the media gateway 300, to video data by use of video encoding and/or compression.

In operation, the media gateway 202 may be operable to support and/or facilitate delivery and/or reception of data, such as multimedia content for example, to a home network serviced by the media gateway 202. For example, the media gateway 202 may obtain, in response to request by user 200 for example, multimedia content which comprise audio and/or video data. In this regard, the multimedia content may be delivered via delivery networks 210, utilizing transport streams (TSs) comprising encoded and/or compressed video and/or audio data. The multimedia content may be encoded and/or delivered using TSs in accordance with MPEG based protocols. The video and/or audio content may be played back via the display 204A and/or the speaker 204B for example. In an exemplary aspect of the invention, the media gateway 202 may support peer-to-peer communications, in which users may exchange audio and/or video data, substantially as described with regard to FIG. 1. The media gateway 202 may be operable to support, for example, multimedia calls, which may comprise video conference (VC) calls. The A/V devices 204A-204D, serviced via the media gateway 202, may be utilized during such multimedia calls. For example, the multimedia calls, the display 204A and/or the speaker 204B may be playing back audio/video (A/V) content corresponding to user output whereas the microphone 204C and/or the camera 204D may be utilized in capturing and/or generating A/V content corresponding to user input. In this regard, the exchanged A/V content may be communicated via, for example, transport streams (TSs). The A/V content communicated from and/or to the client devices 104 may be routed and/or forwarded via the media gateway 202, through the delivery networks 210, to reach remote multimedia call peers, for example.

In various embodiments of the invention, the media gateway 202 may be operable to combine, during peer-to-peer multimedia communication, multiple transport streams (TSs) comprising multimedia content, where the content of different TSs may correlate and/or be related. For example, during a multimedia call, audio/video (A/V) content may be generated and/or captured, via the microphone 204C and/or the camera 204D, based on input of user 200. In some instances, during the multimedia calls, A/V content, which may be obtained via multimedia broadcast transport streams (TSs) that may be received via the media gateway 202, may be played back via the display 204A and/or the speaker 204B. In this regard, at least some of the A/V content generated by the user 200 during the multimedia call may pertain to the perceived broadcast A/V content. For example, the user 200 may comment on and/or may reference something the user 200 is seeing or hearing while perceiving the broadcast A/V content. In other words, some of the A/V content corresponding to the multimedia call may comprise user A/V content pertaining to the broadcast A/V content.

Accordingly, the media gateway 202 may be configured, based on user input for example, to communicate during the multimedia call a copy of the received broadcast A/V transport stream, which may be combined with the multimedia call A/V transport stream which may comprise the user A/V content. Simply copying broadcast A/V transport stream, however, at the point the user A/N transport stream becomes available, may result in mismatch issues. For example, because the broadcast A/V transport stream is continually delivered (e.g., real time feed), the broadcast A/V content in the broadcast A/V transport stream available when the user A/V transport stream becomes available may differ from the broadcast A/V content to which the user A/V content pertains. This may result from delays associated with handling the received broadcast A/V transport stream, such as due to decoding operations for example, delays associated with perceiving the broadcast A/V content, delays associated with capturing and/or generating the user A/V content, and/or delays associated with handling the user A/V content to generate the corresponding user NV transport stream. Accordingly, the media gateway 202 may be configured to ensure that the broadcast A/V transport stream and the user A/V transport stream are synchronized when these transport streams are combined. In this regard, synchronizing the two streams may ensure that the pertinent A/V information carried therein correlate and/or are available at the same time when the transport streams are received and consumed at the other side. For example, the media gateway 202 may be operable to buffer received broadcast A/V transport stream to ensure that the correct copy of the broadcast A/V transport stream may be available when the corresponding user A/V transport streams becomes available.

Figure 3A:
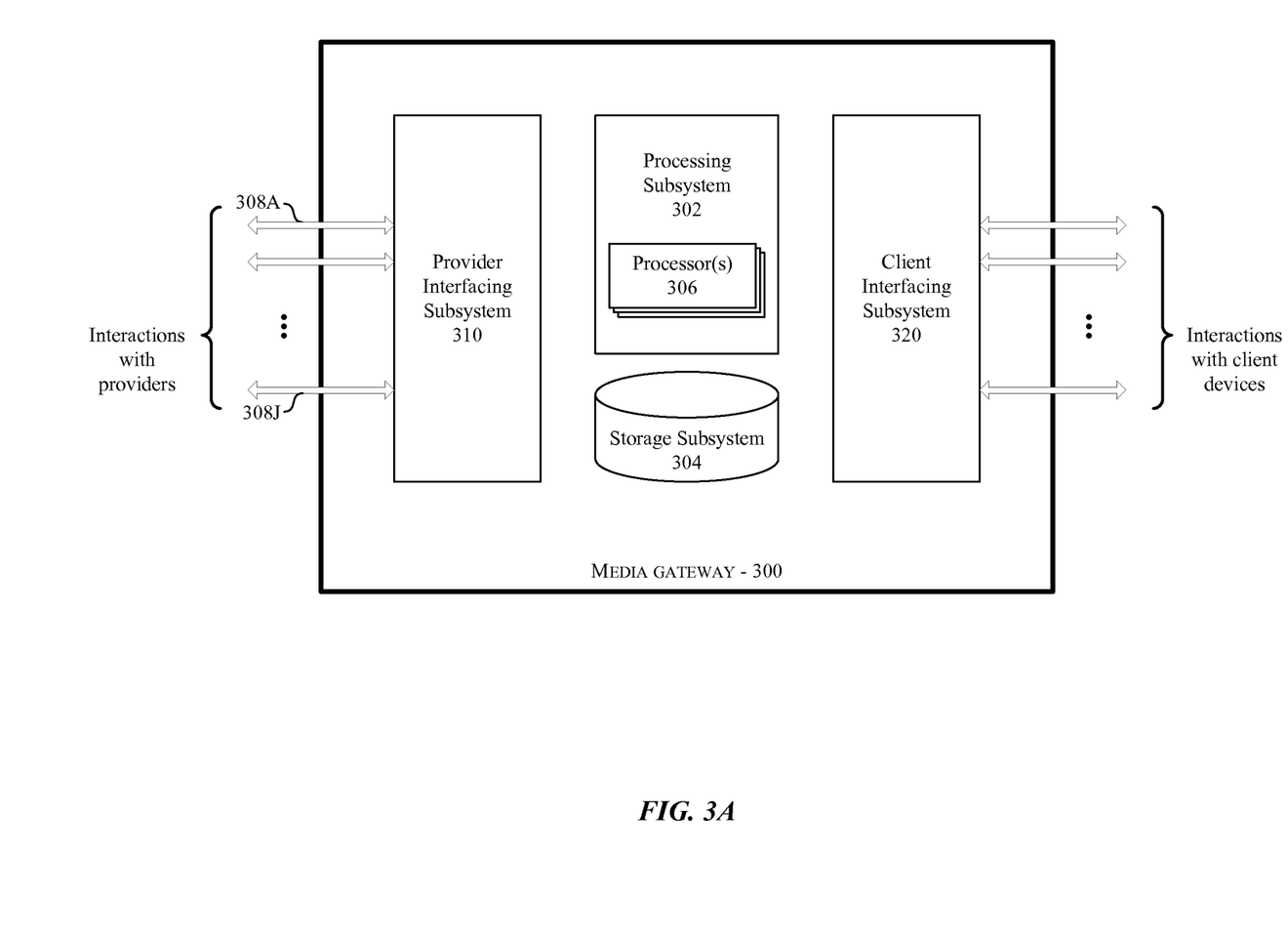
FIG. 3A is a block diagram illustrating an exemplary media gateway that may support multiplexing, synchronizing, and assembling multiple audio/video (A/V) streams, in accordance with an embodiment of the invention.

FIG. 3A is a block diagram illustrating an exemplary media gateway that may support multiplexing, synchronizing, and assembling multiple audio/video (A/V) streams, in accordance with an embodiment of the invention. Referring to FIG. 3A, there is shown a media gateway 300, which may correspond to the media gateway 102 of FIG. 1.

The media gateway 300 may comprise multiple hardware and/or software modules and/or subsystems, such as, for example, a processing subsystem 302, a storage subsystem 304, a provider interfacing subsystem 310, and a client interfacing subsystem 320. In some instances, the media gateway 300 may be implemented such that the various modules listed above may be distributed over multiple devices. Moreover, the modules listed above are provided by way of illustration and not of limitation. Other configurations and/or architectures of the media gateway 300 may be implemented.

The processing subsystem 302 may comprise suitable logic, circuitry, interfaces, and/or code that may be operable to perform control and/or data processing operations in the media gateway 300. The processing subsystem 302 may process data received from the service and/or content providers and/or data received from one or more client devices, such as local client devices in a home network serviced by the media gateway 300. In this regard, the processing subsystem 302 may comprise one or more portions that may be operable to handle certain types of data such as video and/or audio data, for example. The processing subsystem 302 may also be operable to control and/or manage operations of the media gateway 300, and/or executing tasks and/or applications provided therein. In this regard, the processing subsystem 302 may enable execution of applications, programs and/or code which may be stored in the storage subsystem 304, for example. The processing subsystem 302 may be operable to configure and/or control operations of various components and/or subsystems of the media gateway 300, and/or other devices managed by and/or connected to media gateway, by utilizing, for example, one or more control signals. The processing subsystem 302 may also control data transfers within the media gateway 300, in the course of performing various applications and/or tasks for example.

The processing subsystem 302 may comprise, for example, one or more processors 306, which may comprise general purpose processors, such as one or more CPUs, and/or specialized processors, such as one or more dedicated video and/or audio processors. The processor 306 may also comprise one or more secure processors for providing security related operations. While the processing subsystem 302 is shown herein as a single block, the invention needs not be so limited. Accordingly, in instances where the media gateway is implemented a distributed platform, some of the operations and/or functions described herein with regard to the processing subsystems may be performed by different components that may be located in different devices.

The storage subsystem 304 may comprise suitable logic, circuitry, interfaces, and/or code that may be operable to store data utilized in the operations of the media gateway 300. In this regard, the storage subsystem 304 may comprise one or more memory devices that may enable permanent and/or non-permanent storage, buffering, and/or fetching of data, code and/or other information which may be used, consumed, and/or handled in the media gateway 300. For example, the storage subsystem 304 may be utilized to store configuration data, parameters, device information, tracking and/or monitoring information, security information, and intermediate processing data, for example. The storage subsystem 304 may comprise storage media integrated in the media gateway 300 and/or one or more removable storage devices. In this regard, the storage subsystem 304 may comprise different memory technologies, including, for example, read-only memory (ROM), random access memory (RAM), Flash memory, solid-state drives (SSDs), and/or field-programmable gate arrays (FPGAs).

The provider interfacing subsystem 310 may comprise suitable logic, circuitry, interfaces, and/or code that may be operable to communicate data, via one or more physical connections 308A-308J, to one or more corresponding network access service providers, via the delivery networks 110, for example. The provider interfacing subsystem 310 may be operable to support multiple communication protocols, standards, and/or data transport technologies. In this regard, each of the physical connections 308A-308J may connect the gateway 300 to different network access service provider, and may comprise a wired, optical/fiber, or wireless connection. The physical connections 308A-308J may utilize different physical media and/or different physical layer protocols. For example, the connection 308A may comprise a DSL over twisted-pair connection whereas and the connection 308J may comprise a CATV over coaxial cable connection. Accordingly, the provider interfacing subsystem 310 may enable accessing and/or communicating with one or more service providers 120 and/or content providers 130, via the delivery networks 110. The provider interfacing subsystem 310 may also be utilized to communicate data to and/or from third parties. In this regard, the provider interfacing subsystem 310 may enable gateway-to-gateway communication and/or interactions between the media gateway 300 and communication devices located outside the home network 100, directly and/or indirectly through distribution networks corresponding to one or more service providers. The provider interfacing subsystem 310 may enable concurrently communicating with multiple and/or different service/content providers and/or devices.

The client interfacing subsystem 320 may comprise suitable logic, circuitry, interfaces, and/or code that may be operable to communicate with one or more client devices in a home network serviced and/or managed by the media gateway 300, such as the home network 100 of FIG. 1. In this regard, the client interfacing subsystem 320 may enable exchanging data and/or messages with the client devices. The client interfacing subsystem 320 may be operable to support multiple communication protocols, standards, and/or data transport technologies. For example, the client interfacing subsystem 320 may support the links 106a-106j, substantially as describe with regard to FIG. 1.

In operation, the media gateway 300 may be utilized as an interface device that provides connectivity between service and/or content providers and client devices, such as local client devices in a home network, such as the home network 100, serviced by the media gateway 300. The media gateway 300 may enable and/or facilitate delivery and/or reception of content, such as multimedia content, from one or more content providers. The content may be delivered through one or more services providers. For example, the media gateway 300 may communicate with one or more of the service providers 120A120A-120N, via the provider interfacing subsystem 310, to facilitate transmitting requests to, and/or receiving content from the service providers 130, via one or more of the delivery networks 110. The media gateway 300 may also be operable to communicate with a plurality of client devices in a home network, such as client devices 104 in the home network 100, using the client interfacing subsystem 320. In this regard, the client interfacing subsystem 320 may support use of one or more of the links 106. Thus, the media gateway 300 may be operable to distribute the received content to one or more home devices, for content consumption, and/or may perform, directly via the processing subsystem 302 and/or indirectly using other devices, any processing and/or functions comprising, for example decryption and/or account validation, which that may be necessary to ensure that the content may be consumed by one or more of the target home devices.

The media gateway 300 may provide user interface services. In this regard, the media gateway 300 may be operable to support user interfaces, and/or to generate and/or store data corresponding thereto, which may be utilized to enable interactions between the media gateway 300 and client devices serviced by the media gateway 300, or users thereof. Exemplary user interfaces may comprise graphic user interfaces (GUIs), which may enable visual display and/or interactions. Information inputted and/or outputted using the user interfaces may be stored in the media gateway 300, via the storage subsystem 204 for example. The user interfaces may enable configuring the media gateway 300, the client devices, and/or any applications and/or services provided via the media gateway 300. GUIs, and like interfaces, may be displayed using one or more devices coupled to the media gateway 300.

In an exemplary aspect of the invention, the media gateway 300 may be configured to support peer-to-peer communications, in which users may exchange audio and/or video data, substantially as described with regard to FIG. 2. In this regard, the media gateway 300 may be operable to support exchange of audio/video (A/V) content during, for example, multimedia calls, which may comprise video conference (VC) calls. In this regard, the exchanged A/V content may be communicated via, for example, transport streams (TSs). The A/V content communicated from and/or to devices serviced via the media gateway 300 may be routed and/or forwarded via the media gateway 300, to reach multimedia call peers for example.

In various embodiments of the invention, the media gateway 300 may be configured to support combining multiple transport streams (TSs) comprising multimedia content, such as during peer-to-peer multimedia calls. For example, during a multimedia call, the media gateway 300 may be configured to combine, and/or to synchronize the combining of a broadcast A/V stream received via the media gateway 300 and user A/V stream comprising user A/V content generated via client devices, substantially as described with respect to FIG. 2.

Figure 3B:
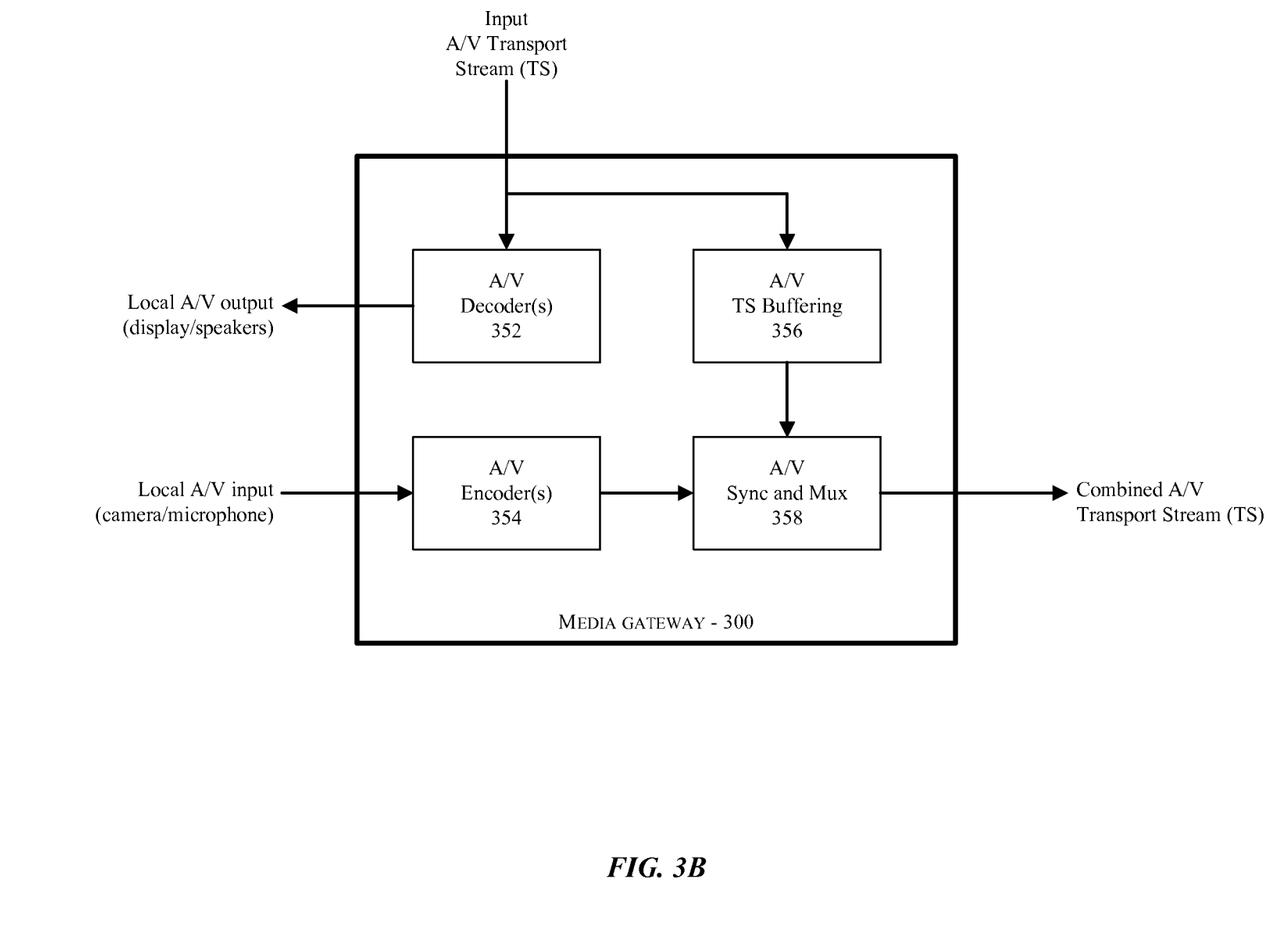
FIG. 3B is a block diagram illustrating various exemplary functions that may be provided and/or utilized in a media gateway to support multiplexing, synchronizing, and assembling multiple audio/video (A/V) streams, in accordance with an embodiment of the invention.

FIG. 3B is a block diagram illustrating various exemplary functions that may be provided and/or utilized in a media gateway to support multiplexing, synchronizing, and assembling multiple audio/video (A/V) streams, in accordance with an embodiment of the invention. Referring to FIG. 3B, there is shown the media gateway 300 of FIG. 3A.

The media gateway 300 may be configured to implement various functions which may be utilized during operations of the media gateway 300, such as when servicing a plurality of client devices in a home network. In this regard, the functions may be implemented by and/or incorporated into various components of the media gateway 300, such as the processing subsystem 302, the storage subsystem 304, the provider interfacing subsystem 310, and/or the client interfacing subsystem 320. In an exemplary aspect of the invention, at least some of various functions implemented by and/or incorporated into the media gateway 300 may be utilized to support and/or facilitate multiplexing, synchronizing, and assembling multiple audio/video (A/V) streams during peer-to-peer communication. The media gateway 300 may implement and/or incorporate, for example an audio/video (A/V) decoder function 352, an A/V encoder function 354, an A/V transport stream (TS) buffering function 356, and an A/V synchronization and multiplexing (Sync/Mux) function 358.

The A/V decoder function 352 may comprise suitable logic, circuitry, interfaces, and/or code that may be operable to decode and/or decompress A/V programming transport stream (TS), which may be received via the media gateway, such as from the Internet and/or view television broadcasts for example. In instances where user associated with media gateway 300 may want to view the A/V programming TS, the A/V decoder function 352 may be operable to determine an applicable decoding profile that may be utilized to decode the selected A/V programming TS. The A/V decoder function 352 may utilize the determined decoding profile to decode the A/V programming TS for display and/or playback, such as display 204A and/or speaker 204B.

The A/V encoder function 354 may comprise suitable logic, circuitry, interfaces, and/or code that may be operable to encode and/or compress an input audio/video (A/V) source stream. In this regard, the input A/V source stream being encoded via the A/V encoder function 354 may correspond to local A/V content, which may be captured and/or generated via microphone 204C and/or camera 204D. The A/V encoder function 354 may determine, during encoding operations, one or more of a set of different encoding profiles. In this regard, the media gateway 300 may maintain a plurality of encoding profiles, each of which may comprise encoding related information or parameters such as, for example, encoding resolution, coder-decoder (CODEC) types, coding rate, segment length or duration, bit rate, frame rate, temporal correlation and/or coding mode.

The A/V encoder function 354 may determine, based on selection of encoding profile for example, among a set of different A/V resolutions, which may be determined based on device capabilities of intended client or peer devices. The A/V encoder function 354 may rescale the A/V source stream into the determined set of different A/V resolutions. For example, the A/V source stream may comprise a video stream with a resolution of 1080p and an audio stream with a resolution of 96 kHz and 24-bit. Based on device capabilities of intended client devices, the A/V encoder function 354 may rescale the A/V source stream with 1080p for video and 96 kHz and 24-bit for audio into different sets of corresponding A/V resolutions such as, for example, with 96 kHz and 16-bit, 192 kHz and 24-bit, 96 kHz and 32-bit, and 192 kHz and 32-bit for audio, and 720p, 1080i, and 1080p for video. The resulting set of rescaled A/V streams may be concurrently encoded into a set of encoded A/V streams for transmission. In this regard, one of the set of encoded A/V streams may be selected for each of the intended client devices. The selected encoded A/V streams may be segmented or divided into A/V segments of equal or variable lengths to be transmitted to the corresponding client devices. The A/V encoder function 354 may dynamically switch between different CODECs based on the varying channel conditions and corresponding device capabilities of the client devices. The CODECs may comprise, for example, H.261, H.263, H.264, MPEG-2, MPEG-4, AVC, VC1 and VP6 for video, and WAV, MP3, MP2, WMA, OGG, G721, G723, G726, and G729 for audio.

The A/V TS buffering function 356 may comprise suitable logic, circuitry, interfaces, and/or code that may be operable to buffer A/V streams, such as the input A/V programming TS. In this regard, the buffering operations may be adaptive and/or configurable. For example, buffering may be performed selectively, such as based on user input and/or based on predetermined conditions. Furthermore, duration of buffering may be dynamically configurable, such that to ensure that the buffered A/V stream may only be retrieved after certain period of time.

The A/V Sync/Mux function 358 may comprise suitable logic, circuitry and/or code that may be operable to perform synchronization and/or multiplexing operations associated with for A/V streaming. For example, the A/V Sync/Mux function 358 may be operable to identify and/or select A/V segments, which may be multiplexed to form a single series of multiplexed A/V segments for transmission, such as to a peer during multimedia peer-to-peer calls, as an output A/V stream. In this regard, the output A/V stream transmission may be performed as HTTP based communication. In instances where multiple constituent streams are being combined, such as when broadband A/V stream is being combined with locally generated user A/V stream, the A/V Sync/Mux function 358 may be operable to identify and extract intended A/V segments stored in the A/V TS buffering function 356. In this regard, the stored A/V segments may correspond to buffered broadcast A/V stream. The extracted A/V segments may then be multiplexed and/or embedded along with A/V segments received from the A/V encoder function 354 to form the output A/V stream. In instances where A/V segments from multiple sources, such as A/V segments received from the A/V encoder function 354 and A/V segments extracted from the A/V TS buffering function 356, are combined and/or multiplexed for transmission, the A/V Sync/Mux function 358 may synchronize the different A/V segments.

In operation, the media gateway 300 may be operable to support and/or handle combining multiple A/V streams during multimedia peer-to-peer communications, substantially as described with regard to FIG. 3A. In this regard, the media gateway 300 may be operable to receive an input broadcast audio/video (A/V) transport stream (TS). The input broadcast A/V TS may be received via terrestrial, cable, and/or satellite broadcasts, and/or via broadband communication, such as over the Internet. The input broadcast A/V TS may comprise audio and/or video content, which may be encoded and/or compressed in accordance with one or more applicable audio and/or video encoding protocol. For example, the input broadcast A/V TS may comprise an MPEG transport stream (TS). In this regard, the MPEG TS may comprise sub-streams, comprising audio and video elementary streams, each of which may be identified by a unique packet ID (PID). Accordingly, the A/V decoder function 352 may be utilized in decoding the input broadcast A/V TS, to enable extracting audio and/or video content carried thereby. The extract A/V content may then be consumed, by a user associated with media gateway 300, such as user 200, via appropriate A/V consuming client devices serviced by the media gateway 300, such as display 204A and/or speaker 204B.

Local A/V content, such as user input, may be captured and/or generated via appropriate A/V consuming client devices serviced by the media gateway 300, such as microphone 204C and/or camera 204D. The local A/V content may be encoded via the A/V encoder function 354. As a result of encoding operations of the A/V encoder function 354, a corresponding local A/V transport stream (TS) may be generated. In an exemplary embodiment of the invention, the encoding profile selected for encoding and/or generating the local A/V TS to match the encoding of the received input broadcast A/V TS. For example, in instances where the input broadcast A/V TS comprises MPEG TS, the local A/V TS may also be generated as MPEG TS, which may comprise sub-streams, comprising audio and video elementary streams each identified by a unique PID.

In an exemplary embodiment of the invention, a copy of the received input broadcast A/V TS may be combined with the generated local A/V TS. This may be done in instances where the local A/V content pertains to perception of and/or playback of the received broadcast A/V content, such as when the user comments on displayed broadcast video. Due to various delays associated with the broadcast and local A/V contents, the media gateway 300 may need to manage handling the TSs to ensure synchronizing the broadcast A/V TS and the local A/V TS when these transport streams are combined. The delays may comprise delays associated with handling of the input broadcast A/V TS, playback of broadcast A/V content, generation of local A/V content, and/or generation of corresponding local A/V TS. For example, a copy of the received broadcast A/V TS, prior to any decoding, may be buffered via the A/V buffering function 356. Once the local A/V TS is generated and/or becomes available, the local A/V TS may be multiplexed with the buffered input broadcast A/V TS via the A/V Sync/Mux function 358 to generate the combined, corresponding output A/V stream. Proper matching between the local A/V content in the local A/V TS and the corresponding broadcast A/V content in the broadcast A/V stream may be ensured by synchronizing the retrieval of broadcast A/V stream from the A/V buffering function 356 with the reception of local A/V stream from the A/V encode function 354. This may be done by controlling and/or configuring the buffering duration associated with the broadcast A/V stream. In this regard, the buffering duration may be determined based on the various delays associated with handling the broadcast and local A/V contents and/or corresponding transport streams.

Figure 4:
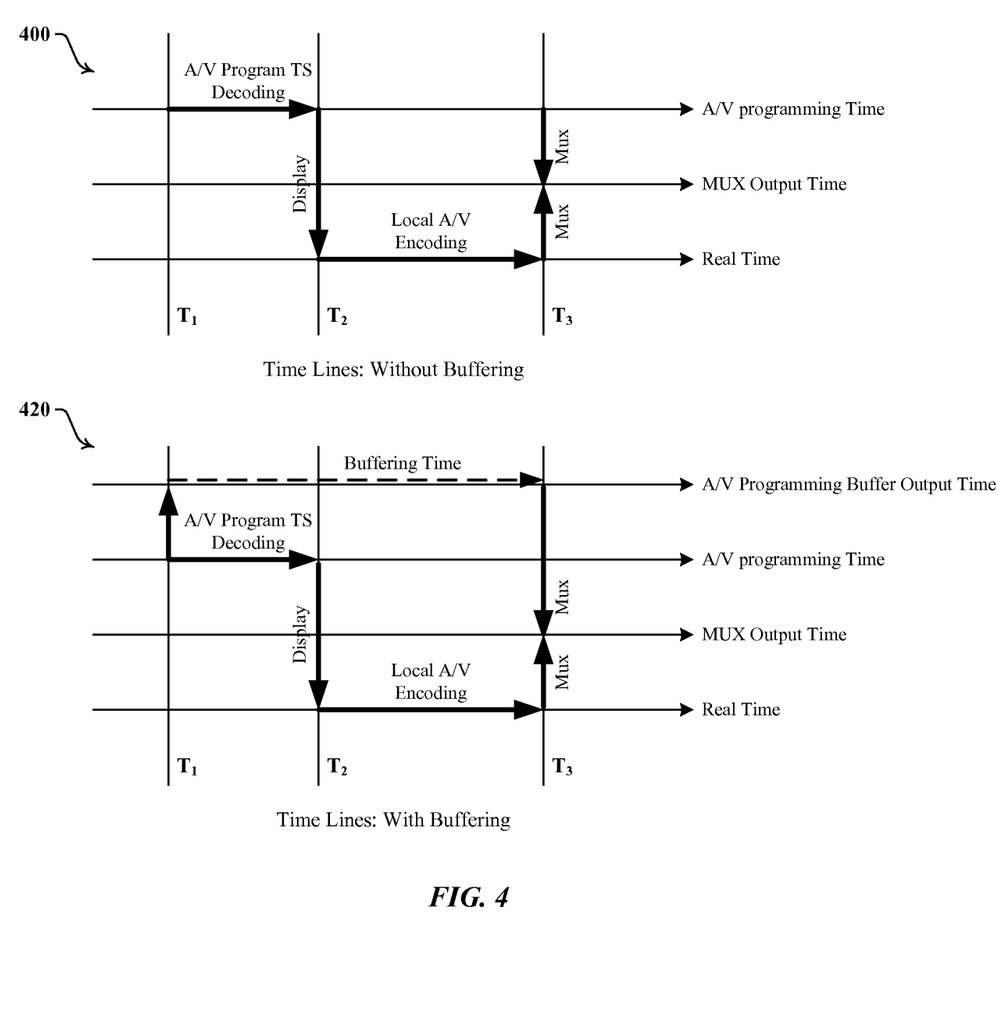
FIG. 4 is a timing diagram that illustrates timing flows corresponding to assembling of multiple audio/video (A/V) via exemplary media gateway (MG) without and with use of buffering to synchronize the assembled multiple audio/video (A/V) streams, in accordance with an embodiment of the invention.

FIG. 4 is a timing diagram that illustrates timing flows corresponding to assembling of multiple audio/video (A/V) via exemplary media gateway (MG) without and with use of buffering to synchronize the assembled multiple audio/video (A/V) streams, in accordance with an embodiment of the invention.

In timing flow 400, which corresponds to multiplexing operations without buffering, a programming audio/video (A/V) TS may be received at T1. The programming A/V TS may be decoded, and due to various latencies such as decoding delay, the video corresponding to content received at T1 may be presented only after some delay, such as at T2, where it may be perceived by user. The user may generate, in response to perceived programming A/V content at T2, local audio/video content which may pertain to the perceived programming A/V content. The local A/V content may be encoded, and due to encoding delay, the corresponding encoded local A/V stream may only become available for assembly after some delay, such as at T3. In this regard, the encoded local A/V stream may be provided at T3 as multiplexer (MUX) input for selection during assembly processing. In this regard, the assembly processing may comprise inclusion of copy of the encoded programming A/V stream, which is correlated with the local content generated at T2. Without buffering, however, the programming A/V content utilized as MUX input at T3 would correspond to real-time programming A/V TS as received at T3 rather than being the programming A/V TS as received at T1.

In timing flow 420, which corresponds to multiplexing operations with buffering, a copy of the programming A/V TS as received at T1 may be buffered. During assembly processing, at T3, the buffered copy of the encoded programming A/V stream, as received at T1, would be retrieved and utilized along with corresponding encoded local A/V stream as generated at T3, and comprising local A/V content generated at T2 based on perception of the programming NV content corresponding to decoded A/V programming TS that had been received at T1. In this regard, the buffering time (delay) may be determined and/or configured to ensure that local A/V content correlated with programming A/V content to which the local A/V content pertains. In this regard, the buffering delay may be configured to account for both the delay in decoding the received programming A/V TS and the delay in encoding the local A/V stream.

Figure 5:
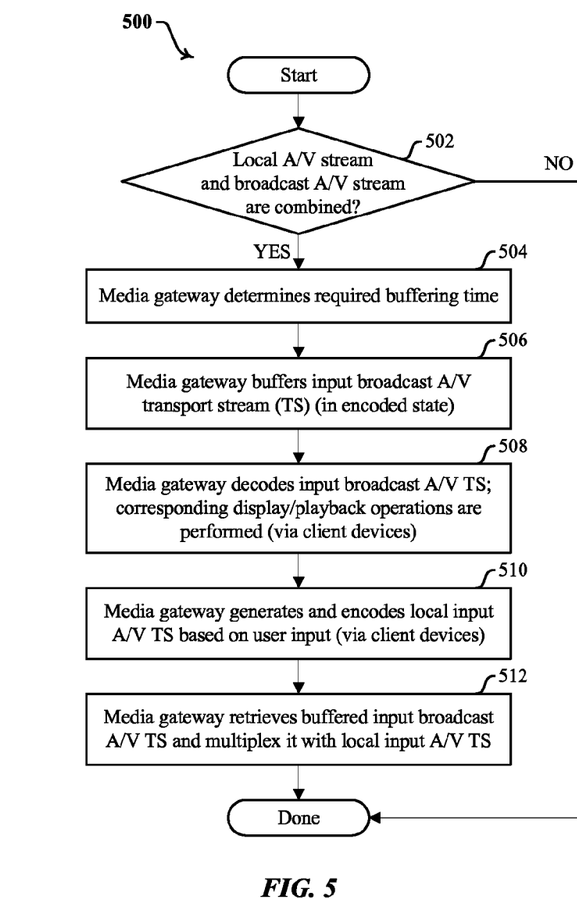
FIG. 5 is a flow chart that illustrates exemplary steps for multiplexing, synchronizing, and assembling multiple audio/video (A/V) streams by a media gateway, in accordance with an embodiment of the invention.

FIG. 5 is a flow chart that illustrates exemplary steps for multiplexing, synchronizing, and assembling multiple audio/video (A/V) streams by a media gateway, in accordance with an embodiment of the invention. Referring to FIG. 5, there is shown a flow chart 500 comprising a plurality of exemplary steps that may be performed by a media gateway, such as the media gateway 300, to enable performing multiplexing, synchronizing, and assembling multiple audio/video (A/V) streams in a media gateway during networking.

In step 502, it may be determined whether the programming audio/video (A/V) content is being combined with local A/V content that pertains to the programming A/V content. In instances where it may be determined that no local content is being combined with programming A/V content, the plurality of exemplary steps may terminate, otherwise the plurality of exemplary steps may proceed to step 504.

In step 504, the media gateway may determine required buffering time. In this regard, the buffering delay may be configured such that it may be sufficient to account for latencies and/or delays associated with handling received programming A/V transport stream (TS), such as decoding the received programming A/V TS and/or displaying/playing back the corresponding A/V content. The buffering delay may also be configured such that it may be sufficient to account for latencies and/or delays associated with capturing and/or generating corresponding local A/V content and generating corresponding local A/V stream. In step 506, the media gateway may buffer the received encoded A/V TS stream.

In step 508, the media gateway may decode the received encoded A/V TS stream, to extract the programming A/V content carried therein, which may enable performing corresponding display/playback operations via available A/V output client devices. In step 510, the media gateway may generate encoded local A/V stream based on local A/V content corresponding to user video and/or audio input, which may be obtained via available A/V input client devices. In step 512, during assembly processing, when the local A/V stream is being multiplexed with corresponding programming A/V stream to which the local A/V content pertains, the media gateway may retrieve buffered programming A/V TS and may multiplex it with current local input A/V TS. In this regard, because the buffering delay is configured to account for all applicable handling and/or processing latencies and/or delays associated with handling of the programming A/V stream and local A/V stream, the buffered programming A/V TS may match current local input A/V TS.

Various embodiments of the invention may comprise a method and system for multiplexing, synchronizing, and assembling multiple audio/video (A/V) streams in a media gateway. The media gateway 300, which may be utilized to service a plurality of client devices, such as the audio/video (A/V) client devices 204A-204D, may be utilized to combine a plurality of encoded multimedia transport streams (TSs). The plurality of encoded multimedia TSs may comprise encoded broadcast multimedia transport stream (TS), received and/or delivered via the media gateway 300, and encoded local multimedia transport stream (TS) which may be locally generated via one or more of the A/V client devices 204A-204D, and which may comprise A/V content pertaining to the broadcast TS. The encoded broadcast multimedia TS may comprise broadcast multimedia content, such as audio/video (A/V) content. The received encoded broadcast multimedia TS may be buffered, via the A/V buffering function 356, in support of TS combining operations. The media gateway 300 may decode, via the A/V decoder function 352, the encoded broadcast multimedia TS to extract the broadcast A/V content carried therein.

The encoded local multimedia TS may be generated based on local multimedia content, such as audio/video (A/V) content, which may be generated and/or captured the microphone 204C and/or the camera 204D. In this regard, the local A/V content may pertain to the consumed broadcast A/V content. Encoding the local multimedia TS may be performed, via the A/V encoder function 354, by utilizing an encoding profile selected from a set of different encoding profiles, each of which comprising various encoding information such as audio and video resolutions, CODEC types, and/or lengths of audio and video segments. The media gateway 300 may adaptively determine duration for buffering the encoded broadcast multimedia TS. In this regard, the buffering duration may be determined adaptively to ensure that the encoded local multimedia TS and the encoded broadcast multimedia TS are synchronized when they are combined. The synchronization may be performed based on correlating local A/V content included in the encoded local multimedia TS with the A/V content included in the encoded broadcast multimedia TS. The buffering duration may be determined based on latencies associated with handling of the encoded broadcast multimedia TS and the encoded local multimedia TS.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multiplexing, synchronizing, and assembling multiple audio/video (A/V) streams in a media gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:

receiving, by a media gateway, an encoded broadcast multimedia transport stream from a service provider over a delivery network, the encoded broadcast multimedia transport stream comprising broadcast multimedia content for rendering via at least one of a plurality of client devices;

decoding, by the media gateway during a first time period, the encoded broadcast multimedia transport stream to extract said broadcast multimedia content;

receiving, by the media gateway, a local multimedia transport stream generated by at least one of the plurality of client devices;

encoding, by the media gateway during a second time period subsequent to the first time period, the received local multimedia transport stream;

buffering, by the media gateway, the encoded broadcast multimedia transport stream for a third time period comprising a sum of the first time period and the second time period; and multiplexing, by the media gateway subsequent to the third time period, the buffered encoded broadcast multimedia transport stream and the encoded local multimedia transport stream into an output multimedia transport stream.

2. The method according to claim 1, wherein encoding the local multimedia transport stream further comprises encoding video information and/or audio information related to rendering of the broadcast multimedia content.

3. The method according to claim 1, further comprising determining, by the media gateway, a duration of the third time period.

4. The method according to claim 3, wherein determining the duration of the third time period further comprises determining a duration of the first time period and determining a duration of the second time period; and wherein multiplexing the buffered encoded broadcast multimedia transport stream and the encoded local multimedia transport stream further comprises synchronizing the encoded broadcast multimedia transport stream and the encoded local multimedia transport stream.

5. The method according to claim 4, further comprising displaying the decoded broadcast multimedia transport stream subsequent to the first time period, and wherein receiving the local multimedia transport stream further comprises receiving the local multimedia transport stream subsequent to the first time period.

6. The method according to claim 5, wherein receiving the local multimedia transport stream subsequent to the first time period further comprises receiving the local multimedia transport stream during display of the decoded broadcast multimedia transport stream.

7. The method according to claim 1, wherein the third time period further comprises a sum of the first time period; the second time period; and a fourth time period, subsequent to the first time period and prior to the second time period, during display of the decoded broadcast multimedia transport stream and generation of the local multimedia transport stream.

8. The method according to claim 7, further comprising determining, by the media gateway, the durations of the first time period, second time period, and fourth time period based on frame rates, audio and video resolutions, and/or CODEC types of the encoded broadcast multimedia transport stream and the encoded local multimedia transport stream.

9. A system, comprising:
a media gateway comprising one or more circuits configured to:
receive an encoded broadcast multimedia transport stream from a service provider over a delivery network, the encoded broadcast multimedia transport stream comprising broadcast multimedia content for rendering via at least one of a plurality of client devices;
decode said encoded broadcast multimedia transport stream, during a first time period, to extract said broadcast multimedia content;
receive a local multimedia transport stream generated by at least one of the plurality of client devices;
encode, during a second time period subsequent to the first time period, the received local multimedia transport stream;

buffer the encoded broadcast multimedia transport stream for a third time period comprising a sum of the first time period and the second time period; and multiplexing, subsequent to the third time period, the buffered encoded broadcast multimedia transport stream and the encoded local multimedia transport stream into an output multimedia transport stream.

10. The system according to claim 9, wherein the one or more circuits are further configured to encode video information and/or audio information related to rendering of the broadcast multimedia content.

11. The system according to claim 9, wherein the one or more circuits are further configured to adaptively determine a duration of the third time period.

12. The system according to claim 11, wherein the one or more circuits are further configured to determine a duration of the first time period; determine a duration of the second time period; and synchronize the encoded broadcast multimedia transport stream and the encoded local multimedia transport stream.

13. The system according to claim 12, wherein the one or more circuits are further configured to provide the decoded broadcast multimedia transport stream for display subsequent to the first time period, and receive the local multimedia transport stream subsequent to the first time period.

14. The system according to claim 13, wherein the one or more circuits are further configured to receive the local multimedia transport stream during display of the decoded broadcast multimedia transport stream.

15. The system according to claim 9, wherein the third time period further comprises a sum of the first time period; the second time period; and a fourth time period, subsequent to the first time period and prior to the second time period, during display of the decoded broadcast multimedia transport stream and generation of the local multimedia transport stream.

16. The system according to claim 15, wherein the one or more circuits are further configured to determine the durations of the first time period, second time period, and fourth time period based on frame rates, audio and video resolutions, and/or CODEC types of the encoded broadcast multimedia transport stream and the encoded local multimedia transport stream.

17. The system according to claim 9, wherein the one or more circuits are further configured to decode the encoded broadcast multimedia transport stream according to an audio resolution capability or a video resolution capability of at least one of the plurality of client devices.

18. A method, comprising:
receiving, by a media gateway, an encoded broadcast multimedia transport stream from a service provider over a delivery network, the encoded broadcast multimedia transport stream comprising broadcast multimedia content for rendering via a client device;
decoding, by the media gateway during a first time period, the encoded broadcast multimedia transport stream to extract said broadcast multimedia content, the first time period comprising a time to decode the broadcast multimedia transport stream in accordance with a resolution capability of at least one of said plurality of client devices;
determining, by the media gateway, a third time period for buffering the encoded broadcast multimedia transport stream based on a sum of the first time period and a second time period for encoding a local multimedia transport stream generated by the client device;

buffering, by the media gateway, the encoded broadcast multimedia transport stream for the third time period; and multiplexing, by the media gateway subsequent to the third time period, the buffered encoded broadcast multimedia transport stream and the encoded local multimedia transport stream.

19. The method according to claim 18, further comprising receiving, by the media gateway, the local multimedia transport stream and encoding the local multimedia transport stream during the second time period.

20. The method according to claim 18, further comprising determining, by the media gateway, the durations of the first time period and second time period delay according to frame rates, audio and video resolutions, and/or CODEC types of the encoded broadcast multimedia transport stream and the encoded local multimedia transport stream.

21. The method according to claim 1, wherein decoding the encoded broadcast multimedia transport stream to extract said broadcast multimedia content further comprises decoding the encoded broadcast multimedia transport stream according to an audio resolution capability or a video resolution capability of at least one of the plurality of client devices.

* * * * *